UNITED STATES PATENT OFFICE.

OSCAR DRESSEL, OF ELBERFELD, AND RICHARD KOTHE, OF VOHWINKEL, GERMANY, ASSIGNORS TO FARBENFABRIKEN VORM. FRIEDR. BAYER & CO., OF ELBERFELD, GERMANY, A CORPORATION OF GERMANY.

BLACK AZO DYE.

No. 858,444.       Specification of Letters Patent.       Patented July 2, 1907.

Application filed February 4, 1907. Serial No. 355,638.

*To all whom it may concern:*

Be it known that we, OSCAR DRESSEL and RICHARD KOTHE, doctors of philosophy, chemists, citizens of the German Empire, residing at, respectively, Elberfeld and Vohwinkel, near Elberfeld, in the Kingdom of Prussia, Germany, have invented new and useful Improvements in Black Azo Dyes, of which the following is a specification.

Our invention relates to the manufacture and production of new black azodyestuffs containing once or several times the glycin radical $-NH-CH_2-COOH$. The process for their production consists in combining the tetrazo-compound of the dyestuff: para-aminobenzene-azo-2-amino-8-naphthol-6-sulfonic acid either with two molecules of an azodyestuff component containing the glycin radical ($-NH-CH_2-COOH$) or with one molecule of such a compound and one molecule of any other azodyestuff component, or vice versa or in converting into the monodiazo compound the disazodyestuff

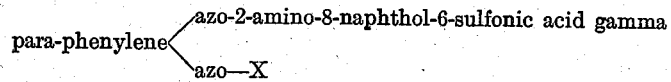

(X meaning an azodyestuff component which may or may not contain the glycin radical) and combining the diazocompound thus obtained either with an azodyestuff component containing the glycin radical or, if X already contains this radical, with any azodyestuff component.

In order to carry out this process one can *e. g.* proceed as follows. The tetrazo-compound of para-amino-benzene-azo-2-amino-8-naphthol-6-sulfonic acid gamma is combined either with two molecules of meta-aminophenylglycin

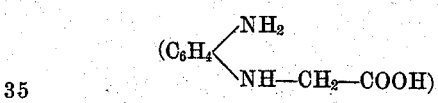

or with two molecules of meta-aminotolylglycin

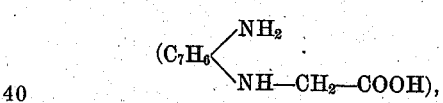

or with one molecule of one of these compounds and one molecule of meta-phenylenediamin or meta-toluylenediamin, or vice versa.

Analogous coloring matters are obtained if in the preceding example phenylenediamin or meta-toluylenediamin are replaced by another azo-dyestuff component, such as, 2-amino-8-naphthol-6-sulfonic acid gamma, 2-amino-5-naphthol-7-sulfonic acid, 1-6- or 1-7-naphthylamin sulfonic acid, substitution products of these compounds, naphthol sulfonic acids, resorcinol, aminophenols, etc. etc.

Dyestuffs of analogous dyeing properties can also be obtained on carrying out the combination of the above components in any other order of succession *e. g.* on combining the diazocompound of para-aminobenzene-1-6-naphthylamin sulfonic acid with one molecule of 2-amino-8-naphthol-6-sulfonic acid, diazotizing the coloring matter with one molecule of nitrite and combining the diazo-compound with meta-aminophenylglycin or meta-aminotolylglycin etc. etc. Instead of meta-amino-phenylglycin or meta-aminotolylglycin other suitable compounds containing the glycin radical can be employed, such as, glycins of amino-naphthol sulfonic acids, naphthylamin sulfonic acids, or the like.

The new dyestuffs are dark powders easily soluble in water and dye full black shades. Their great affinity for the vegetable fiber permits an important simplification in the dyeing of half-woolen goods as it is possible to dye the cotton fiber of such fabrics during the milling process full shades, the wool being scarcely tinged at all. Upon reduction with stannous chlorid and hydrochloric acid the new dyestuffs are decomposed para-phenylenediamin and 2-7-diamino-8-naphthol-6-sulfonic acid being two of the products which are formed.

In order to carry out the new process we can proceed as follows, the parts being by weight.

*Example I.*—15 parts of acetyl-para-phenylenediamin are diazotized in the usual manner and the resulting diazo-compound is introduced into a solution of 24 parts of 2-amino-8-naphthol-6-sulfonic acid gamma containing an excess of sodium carbonate. From the resulting azo-dyestuff the acetyl group is eliminated in the usual way by boiling with caustic soda lye. The monoazodyestuff thus produced having the formula:

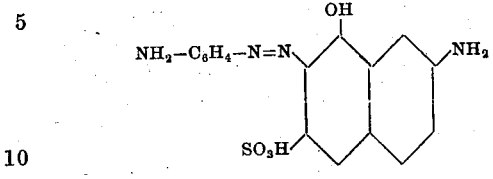

is then tetrazotized by means of 14 parts of sodium nitrite and the necessary quantity of HCl and the tetrazo-compound thus prepared is mixed with an aqueous solution of 16,6 parts of meta-aminophenylglycin. Sodium acetate is added to neutralize the free mineral acid. The intermediate compound which forms at once is mixed with 24 parts of 2-amino-8-naphthol-6-sulfonic acid gamma dissolved in water containing an excess of sodium carbonate. The mixture is stirred for several hours, the dyestuff is (if necessary salted out), filtered off and dried. It dyes cotton deep black.

*Example II.*—The tetrazo-compound of para-aminobenzene-azo-2-amino-8-naphthol-6-sulfonic acid gamma, the preparation of which is described in Example I, is mixed with a solution of 30,3 parts of the sodium salt of alphanaphthylglycin-6-sulfonic acid containing an excess of sodium acetate. When the formation of the intermediate compound is complete a solution of 10,8 parts of meta-phenylenediamin is added. The mixture is stirred for some time and then rendered alkaline with sodium carbonate. The dyestuff is salted out, filtered off and dried. It dyes cotton full bluish-black shades.

*Example III.*—The dyestuff obtained from 15 parts of acetyl-para-phenylenediamin and 22,3 parts of 1-naphthylamin-6-sulfonic acid is after elimination of the acetyl group monodiazotized with the aid of 7 parts of sodium nitrite and the necessary quantity of hydrochloric acid and the resulting diazo compound is added to an aqueous solution of 24 parts of 2-amino-8-naphthol-6-sulfonic acid gamma containing an excess of sodium carbonate. When the formation of the dyestuff is complete, it is salted out, filtered, mixed up with water and rediazotized with the aid of 7 parts of sodium nitrite and hydrochloric acid. The diazo-compound is then added to a solution of 18 parts of meta-aminotolylglycin containing an excess of sodium acetate. The mixture is stirred, rendered alkaline with sodium carbonate and the dyestuff after complete precipitation with common salt is filtered off and dried. It dyes cotton bluish-black shades.

In the following table the shades of some of the new dyestuffs are given:

| Dyestuff obtained from: 1 mol. para-phenylenediamin+1 mol. 2-amino-8-naphthol-6-sulfonic acid gamma (tetrazotized)+ | Dyes cotton: |
|---|---|
| 1) 2 mol. meta-aminophenylglycin | Black. |
| 2) 1 mol. meta-phenylenediamin+1 mol. meta-aminophenylglycin. | Greenish-black. |
| 3) 1 mol. meta-aminotolylglycin+1 mol. meta-toluylenediamin. | Bluish-black. |
| 4) 1 mol. meta-aminophenylglycin+1 mol. meta-toluylenediamin. | Black. |
| 5) 1 mol. meta-aminophenylglycin+1 mol. meta-aminophenol. | Black. |
| 6) 1 mol. meta-aminophenylglycin+1 mol. resorcinol. | Black. |
| 7) 1 mol. meta-aminophenylglycin+1 mol. 1-naphthylamin-6-sulfonic acid. | Greenish-black. |
| 8) 1 mol. meta-aminophenylglycin+1 mol. 1-ethylaminonaphthalene-6-sulfonic acid. | Greenish-black. |
| 9) 1 mol. glycin of the 1-naphthylamin-6-sulfonic acid+1 mol. meta-toluylenediamin. | Bluish-black. |
| 10) 1 mol. meta-aminophenylglycin+1 mol. 1-naphthylamin-7-sulfonic acid. | Greenish-black. |
| 11) 1 mol. meta-aminophenylglycin+1 mol. 1-naphthol-4-sulfonic acid. | Bluish-black. |
| 12) 1 mol. meta-aminophenylglycin+1 mol. 2-naphthol-6-sulfonic acid. | Bluish-black. |
| 13) 1 mol. meta-aminophenylglycin+1 mol. 1-amino-5-naphthol-7-sulfonic acid. | Greenish-black. |
| 14) 1 mol. meta-aminophenylglycin+1 mol. 2-amino-5-naphthol-7-sulfonic acid. | Bluish-black. |
| 15) 1 mol. meta-aminophenylglycin+1 mol. 2-ethylamino-5-naphthol-7-sulfonic acid. | Bluish-black. |
| 16) 1 mol. meta-toluylenediamin+1 mol. glycin of the 2-amino-5-naphthol-7-sulfonic acid. | Bluish-black. |
| 17) 1 mol. meta-aminotolylglycin+1 mol. 2-diethylamino-5-naphthol-7-sulfonic acid. | Bluish-black. |
| 18) 1 mol. meta-aminophenylglycin+1 mol. 2-phenylamino-5-naphthol-7-sulfonic acid. | Bluish-black. |
| 19) 1 mol meta-aminotolylglycin+1 mol. 2-paratolylamino-5-naphthol-7-sulfonic acid. | Bluish-black. |
| 20) 1 mol. meta-aminophenylglycin+1 mol. 2-amino-8-naphthol-6-sulfonic acid. | Black. |
| Dyestuff obtained from: | |
| 21) 1 mol. acetyl-para-phenylenediamin+1 mol. 1-naphthylamin-6-sulfonic acid (the acetyl group being split off)+1 mol. 2-amino-8-naphthol-6-sulfonic acid+1 mol. meta-amino-phenylglycin. | Bluish-black. |
| 22) 1 mol. acetyl-para-phenylenediamin+1 mol. 1-naphthylamin-6-sulfonic acid (the acetyl group being split off)+1 mol. 2-amino-8-naphthol-6-sulfonic acid+1 mol. meta-aminotolylglycin. | Bluish-black. |

Having now particularly described our invention and in what manner the same is to be performed, what we claim as new, and desire to secure by Letters Patent, is:—

The herein-described azo dyestuffs, characterized by the glycin radical $-NH-CH_2-COOH$, which dyestuffs can be obtained by combining the tetrazo-compound of the dyestuff: para-amino-benzene-azo-2-amino-8-naphthol-6-sulfonic acid with two molecules of azo dyestuff components, of which at least one must contain the glycin radical, which dyestuffs are in the shape of their alkaline salts dark powders, easily soluble in water, dyeing unmordanted cotton black shades and being decomposed by reduction with stannous chlorid and hydrochloric acid, para-phenylenediamin and 2-7-diamino-8-naphthol-6-sulfonic acid being two of the products which are formed, substantially as described.

In testimony whereof we have hereunto set our hands in the presence of two subscribing witnesses.

OSCAR DRESSEL. [L. S.]
RICHARD KOTHE. [L. S.]

Witnesses.
OTTO KÖNIG,
J. A. RITTERSHAUS.